US012586235B2

(12) United States Patent
    Duraiswami et al.

(10) Patent No.:     US 12,586,235 B2
(45) Date of Patent:         Mar. 24, 2026

(54) SYSTEMS AND METHODS FOR HEAD RELATED TRANSFER FUNCTION PERSONALIZATION

(71) Applicant: CEVA Technologies, Inc., Rockville, MD (US)

(72) Inventors: Ramani Duraiswami, Highland, MD (US); Bowen Zhi, College Park, MD (US); Dmitry Zotkin, College Park, MD (US)

(73) Assignee: CEVA Technologies, Inc., Rockville, MD (US)

( * ) Notice:   Subject to any disclaimer, the term of this patent is extended or adjusted under 35 U.S.C. 154(b) by 362 days.

(21) Appl. No.:   18/021,164

(22) PCT Filed:   Aug. 13, 2021

(86) PCT No.:   PCT/US2021/045971
    § 371 (c)(1),
    (2) Date:   Feb. 13, 2023

(87) PCT Pub. No.:  WO2022/036238
    PCT Pub. Date: Feb. 17, 2022

(65)            Prior Publication Data
    US 2023/0222687 A1      Jul. 13, 2023

Related U.S. Application Data

(60) Provisional application No. 63/065,660, filed on Aug. 14, 2020.

(51) Int. Cl.
    *G06T 7/73*        (2017.01)
    *H04S 7/00*        (2006.01)

(52) U.S. Cl.
    CPC ............... *G06T 7/73* (2017.01); *H04S 7/301* (2013.01); *G06T 2207/30204* (2013.01); *H04S 2420/01* (2013.01)

(58) Field of Classification Search
    None
    See application file for complete search history.

(56)            References Cited

U.S. PATENT DOCUMENTS 9,900,722    B2    2/2018    Bilinski et al.
    2013/0169779 A1*   7/2013    Pedersen ............... H04R 25/70
                                                      348/E7.085
    2018/0204341 A1    7/2018    Kaneko
                        (Continued)

OTHER PUBLICATIONS

International Written Opinion and Search Report in International Patent Application No. PCT/US2021/045971, issued Nov. 17, 2021, 9 pages.
                        (Continued)

*Primary Examiner* — Leon Viet Q Nguyen
(74) *Attorney, Agent, or Firm* — FOLEY & LARDNER LLP

(57)            ABSTRACT

A head-related transfer function (HRTF) generation system includes one or more processors configured to retrieve first image data of a first ear of a subject, compare the first image data with second image data of a plurality of second ears to identify a particular second ear of the plurality of second ears matching the first ear, identify a template HRTF associated with the particular second ear, and assign an HRTF to the subject based on the template HRTF.

17 Claims, 3 Drawing Sheets

(56)                 References Cited

U.S. PATENT DOCUMENTS

| 2018/0373957 A1* | 12/2018 | Lee | H04S 7/302 |
| 2019/0082283 A1* | 3/2019 | Riggs | H04S 3/008 |
| 2021/0211825 A1* | 7/2021 | Joyner | G06V 40/10 |
| 2021/0385600 A1* | 12/2021 | Fukuda | H04S 7/301 |

OTHER PUBLICATIONS

Satarzadeh et al., "Physical and filter pinna models based on anthropometry," Audio Engineering Society Convention 122, AES 122nd Convention, Vienna, Austria, May 5-8, 2007 (20 pages).

Algazi et al., "Structural composition and decomposition of hrtfs." In Proceedings of the 2001 IEEE Workshop on the Applications of Signal Processing to Audio and Acoustics (Cat. No.01TH8575), Oct. 2001 (pp. 103-106).

Algazi et al., "The cipic hrtf database." In Proceedings of the 2001 IEEE Workshop on the Applications of Signal Processing to Audio and Acoustics (Cat. No.01TH8575), Oct. 2001 (pp. 99-102).

Algazi et al., "The use of head-and-torso models for improved spatial sound synthesis," AES 113th Convention, Los Angeles, CA, USA, Oct. 5-8, 2002 (18 pages).

Kumar et al., "Kepler: Keypoint and pose estimation of unconstrained faces by learning efficient h-cnn regressors." In 2017 12th IEEE International Conference on Automatic Face Gesture Recognition (FG 2017) May 2017 (pp. 258-265).

Raykar et al., "Extracting the frequencies of the pinna spectral notches in measured head related impulse responses." The Journal of the Acoustical Society of America, Jul. 2005, vol. 118, No. 1 (pp. 364-374).

Ronneberger et al., "U-net: Convolutional networks for biomedical image segmentation," CoRR, abs/1505.04597, May 18, 2015 (8 pages).

Zotkin et al., "Fast head-related transfer function measurement via reciprocity," The Journal of the Acoustical Society of America, Oct. 2006, vol. 120, No. 4 (pp. 2202-2215).

Zotkin et al., "Hrtf personalization using anthropometric measurements," 2003 IEEE Workshop on Applications of Signal Processing to Audio and Acoustics (IEEE Cat. No. 03TH8684), Oct. 2003 (pp. 157-160).

* cited by examiner

SYSTEMS AND METHODS FOR HEAD RELATED TRANSFER FUNCTION PERSONALIZATION

CROSS-REFERENCE TO RELATED APPLICATIONS

The present application is a National Stage Entry of PCT Application No. PCT/US2021/045971, filed Aug. 13, 2021, which claims the benefit of priority to U.S. Provisional Application No. 63/065,660, filed Aug. 14, 2020. The disclosures of these applications are hereby incorporated by reference in their entireties.

BACKGROUND

Head-related transfer functions (HRTFs) characterize how sound received from a source at a particular location in space is modified by scattering off the listener's anatomy. HRTFs can be applied to audio data to enable the audio data to more accurately and realistically be provided to a user, such as to be provided in a manner that allows to user to perceive a source location of sounds generated using the audio data. Some HRTF generation systems can use microphone array systems, such as described in U.S. Pat. Nos. 7,720,229 and 9,326,064, which are each incorporated herein by reference in their entireties. It can be difficult to generate an HRTF for a particular user without significant computational resource expenditure or customized audio sensor hardware.

SUMMARY

Systems and methods in accordance with the present disclosure can enable more rapid generation of accurate HRTFs for users, such as by using image data of one or more ears of the user detected by a portable electronic device to match the image data with data maintained in a database and associated with stored HRTFs. Since the size of any database is limited, to improve the ability to match and generate an HRTF for a novel user, various operations to modify both the HRTFs and images in the database and the images from novel users are proposed, which include customization to the scale, head size, and orientation of the user's ears. For example, a system can perform various operations (or combinations thereof) on the image data to generate the HRTF for the user, such as to receive image data of a user's ear, flip the image data to the left or right ear, (e.g., if all ears are maintained as right ear orientation in the database, flip a left ear image of the user to a right ear orientation), and an orientation that matches that of image data in the database with respect to a vertical axis, apply a marker detection model to the image data to detect locations of landmarks of the ear from the image data, non-dimensionalize or otherwise rescale the locations of the landmarks to match scaling of landmarks of the image data of the database, identify a match between the possibly scaled image data of the user's ear and the possibly scaled and oriented image data of a particular ear in the database, retrieve an HRTF corresponding to the particular ear, and rescale and reorient the HRTF as appropriate to correspond to that of the user. The system can apply one or more head and torso (HAT) models to the HRTF, such as to modify the HRTF to provide more accurate interaural time differences. The system can be incorporated in or can provide the HRTF for use by various applications and devices, such as display devices, headphones, and other devices that output audio to the user. By generating the HRTF using various such operations described herein, the HRTF can be generated in a more computationally and data efficient manner and provide accurate audio spatial localization for improved reception of the audio by the user.

At least one aspect relates to a method for generating head related transfer functions that includes retrieving, by one or more processors, first image data of a first ear of a subject, comparing, by the one or more processors, the first image data with second image data of a plurality of second ears to identify a particular second ear of the plurality of second ears matching the first ear, identifying, by the one or more processors, a template HRTF associated with the particular second ear, and assigning, by the one or more processors, a HRTF to the subject based on the template HRTF.

At least one aspect relates to a system that includes one or more processors configured to retrieve first image data of a first ear of a subject, compare the first image data with second image data of a plurality of second ears to identify a particular second ear of the plurality of second ears matching the first ear, identify a template HRTF associated with the particular second ear, and assign an HRTF to the subject based on the template HRTF.

At least one aspect relates to a non-transitory computer-readable medium that includes processor-executable instructions that when executed by one or more processors, cause the one or more processors to retrieve left image data of a left ear of a first subject and right image data of a right ear of the first subject; modify an orientation of the left image data or right image data to have an orientation of second image data of a plurality of second subjects maintained in a database, modify a scale of the left image data and the right image data to have a scale of the second image data, compare the modified left image data and the modified right image data with the second image data to identify left ear second image data matching the modified left image data and right ear second image data matching the modified right image data, retrieve a first HRTF associated with the left ear second image data in the database and a second HRTF associated with the right ear second image data in the database, and output an output HRTF based on the first HRTF and the second HRTF.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
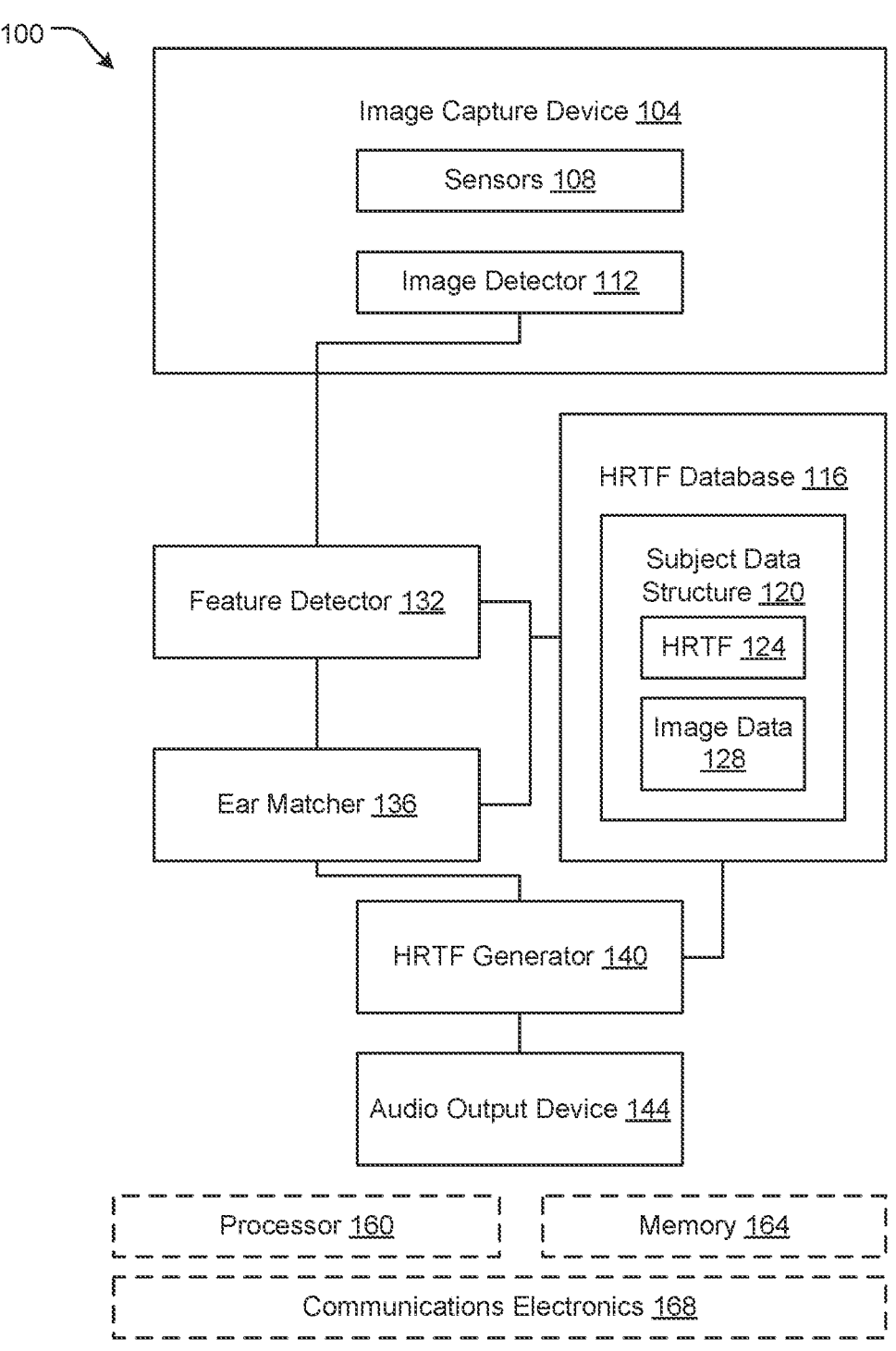
FIG. 1 is a block diagram of an example of an HRTF generation system.

The present disclosure provides for many different embodiments. While certain embodiments are described below and shown in the drawings, the present disclosure provides only some examples of the principles described herein and is not intended to limit the invention to the embodiments illustrated and described.

Systems and methods described herein can enable improved generation of HRTFs to provide improved audio to a user. For example, a portable electronic device can be used to capture image data of one or more ears of a user, and this image data (e.g., as opposed to complex audio-based ear scanning data, which can require significant time and/or complex sensor hardware) can be applied as input to one or more models to generate the HRTF of the user. The HRTF can used by a variety of applications and devices, including for virtual reality (VR), augmented reality (AR), simulation systems, and other applications in which it can be useful to provide audio to the user that has precise locations as perceived by the user. HRTFs can be highly specific to particular individuals, such that generating the HRTFs to be specific to the user can enable notable improvements in how sound provided to the user based on the HRTF is perceived by the user.

FIG. 1 depicts an example of an HRTF generation system 100. The HRTF generation system 100 can be used to receive sensor data regarding a user, such as image data of the user, generate an HRTF specific to the user based on the sensor data, and provide the HRTF to a device to enable audio to be provided to a user that is modified using the HRTF. Various operations performed by the HRTF generation system 100 can be performed by one or more devices or combinations of devices described herein, such as for networking or computational efficiency purposes, or to limit access to user data that may be used for generating the HRTF.

The HRTF generation system 100 can include an image capture device 104 that includes one or more sensors 108 to detect images. The image capture device 104 can be a standalone camera or can be provided as part of or communicably coupled to a portable electronic device (e.g., a cell phone or tablet). The sensor 108 can include any type of one or more cameras. The cameras can be visible light cameras (e.g., color or black and white), infrared cameras, 3D cameras which generate geometries or meshes, or combinations thereof. The sensors 108 can include multiple sensors 108 of various resolution or other characteristics, and located at various locations on the image capture device 104 (e.g., to have varying fields of view).

The sensor 108 can detect at least one image of a user, such as to detect at least one of a first image of a left ear of the user or a second image of a right ear of the user. The sensor 108 can output image data representative of the images. The image data can include a plurality of pixels, which can be arranged in one or more coordinate dimensions (e.g., a two-dimensional matrix for two-dimensional images; a three-dimensional matrix for three-dimensional images including depth information). Sensor data such as intensity and color can be assigned to each pixel to form the image represented by the image data.

The image capture device 104 can include an image detector 112. The image detector 112 can include any function, operation, routine, logic, model, or instructions executed by the image capture device 104 or components thereof to cause the sensor 108 to detect the at least one image. For example, the image detector 112 can receive a command (e.g., via a user interface of the image capture device 104 or application operated by the image capture device 104) to cause the sensor 108 to detect the at least one image.

The image detector 112 can use the sensor 108 to detect images that satisfy (e.g., meet or exceed) criteria for effective use for generating HRTFs for the user. For example, the criteria can include one or more criteria associated with the orientation of the ear relative to the sensor 108 (e.g., orienting the sensor 108 to be most orthogonal to the ear), resolution of the image, size of the image, focus, etc. The image detector 112 can cause the sensor 108 to detect a plurality of images, and select, from the plurality of images, a particular image that satisfies the criteria. The image detector 112 can cause the sensor 108 to store or output the particular image. The image detector 112 can perform various pre-processing operations on the images, such as lighting and/or pose modifications.

The image detector 112 can determine an ear detection score using the images detected by the sensor 108. The ear detection score can be a measurement of the quality of the image for purposes of later matching. For example, the image detector 112 can identify the locations of features of the ear represented by the images, such as those associated with markers as described below, and distances between the features, and compare the locations of the features and/or distances between the features to predetermined thresholds to determine the ear detection score (e.g., based on differences between the distances and the predetermined thresholds). The image detector 112 can assign a bounding box (e.g., coordinates of one or more vertices of the bounding box, such as four corners of a rectangular bounding box) responsive to detecting the ear in an image for which the ear detection score satisfies the criteria.

The image detector 112 can determine the ear detection score by applying the image data of the images as input to a detection model. The detection model can be a machine learning model trained to generate the ear detection score using training data that includes images of ears labeled with scores or categories (e.g., based on angle from a camera to the ear, where more orthogonal angles are given higher scores), such as by performing supervised learning by applying the images of the training data as input to the model, determining a candidate output of the model, comparing the candidate output to the scores of the training data corresponding to the images, modifying the detection model (e.g., modifying various weights or biases of a neural network of the detection model) responsive to the comparison indicating that model is not sufficiently trained, and outputting the detection model responsive to the comparison indicating the model is sufficiently trained (e.g., differences between the candidate output and the training data scores are less than a threshold, or a threshold number of iterations has been performed). The detection model can include at least one neural network including one or more convolutional blocks (e.g., convolution blocks of the MobileNetV2 architecture). The output of the convolution blocks can be provided as input to a pair of shallow output networks that include two additional convolutional layers each, with one outputting the ear detection score (e.g. as a detection probability) and the other outputting bounding box coordinates. The detection model can be trained by applying supervised learning using training data that includes images of ears to which labelled ear bounding boxes are assigned. Data augmentation can be performed on the images detected by the image detector 112, such as cropping, blur, noise, rotation, as well as contrast and brightness adjustment.

The image detector 112 can determine a size scale associated with the images. The size scale can represent a relationship between pixels and real-world distance, such as a ratio of pixels to distance (e.g., pixels per centimeter). The image detector 112 can determine the size scale by performing various image processing or computer vision operations to detect features in the image (e.g., features of the head of the user; features of the environment around the user), and determine the size scale from the detected features. The size scale can be used as an input to a head and torso model (HAT) or other models or functions used for generating the HRTF for the user.

The image detector 112 can cause the user interface to output an audio signal indicative of the criteria, such as to signal to a user that the image detected by the image capture device 104 is (or is not) of sufficient quality to be used for determining the HRTF. For example, the image detector 112 can generate an audio signal parameter (e.g., frequency, duration, intermittency, speech data, or various combinations thereof) using the ear detection score, such as by applying the ear detection score as input to a lookup table, function, heuristic, or other algorithm to map the ear detection score to the audio signal parameter, and cause a sound to be outputted having the audio signal parameter. For example, the image detector 112 can cause at least one of a relatively higher frequency sound or speech data (e.g., "good image") based on the ear detection score satisfying the criteria.

The image capture device 104 can output image data of the at least one image (e.g., the at least one image that satisfied the criteria for generating the HRTF). For example, the image capture device 104 can output the at least one image itself (e.g., in a RAW image format, or other image file formats such as .jpeg). The image capture device 104 can extract one or more features from the at least one image, and output the image data to include the extracted features (e.g., instead of the image itself). For example, the image capture device 104 can extract features such as markers (e.g., pixel coordinates of locations of markers), distances between markers, non-dimensionalized values of pixel coordinates or distances, or various combinations thereof, and output the extracted features.

The HRTF generation system 100 can include an HRTF database 116. The HRTF database 116 can store or maintain subject data structures 120 that include image data 128 of the ears of subjects along with the corresponding HRTFs 124 of those subjects. The HRTF 124 can be a function (e.g., transfer function), filter, model, algorithm, lookup table, heuristic, or various combinations thereof that receives a sound (e.g., sound data) and a source location of the sound and outputs an output sound (e.g., output sound data) indicative of how the sound would be perceived from the source location at the ear of the subject, accounting for factors such as the anatomy of the user that affects the sound before it reaches the ear of the subject (and thus enables the subject to determine the source location). The HRTFs 124 can include or be based on head related impulse responses (HRIRs), such as where the HRTF is a Fourier transform of the HRIR (e.g., the HRIR can represent filtering of a sound source for perception at the at least one of the left ear or right ear). For example, the HRIR can be a time domain impulse response associated with a particular source location (which can be represented by a direction from the particular source location, such as a direction defined by angular directions, such as at least one of azimuth angle or elevation angle), such that the HRIR represents how sound received from the particular source location is modified (e.g., filtered) from outside the subject's ear canal to the subject's ear. The particular source location can be assumed to be in a far field (e.g., greater than or equal to about one wavelength distance) relative to the ear to perceive sound from the particular source location. The HRIR can include a plurality of samples (e.g., 32 to 256 samples at typical sampling rates for audio data sampling) of response (e.g., amplitude, or relative signal strength in dB) as a function of time, such as samples detected through a process of receiving sounds from various source locations at the subject's ears. The HRTF 124 can be a Fourier transform of the HRIR to provide response as a function of frequency. As such, the HRIR and associated HRTF 124 can be characterized by the particular source location of the source of the sound and the subject for which the sound was measured.

For example, the HRTF 124 can effectively filter audio to which the HRTF 124 is applied by modifying the amplitude of the sound at various frequencies in a manner representative of how the anatomy (and environment) of the subject modifies the sound, so that audio data to which the HRTF 124 is applied using a source location of the audio data can be perceived as coming from the source location. At least one of the HRTF 124 and the HRIR associated with the HRTF 124 can be maintained in the subject data structure 120, including applying various scaling or rotations operations to the maintained HRTF 124 (or HRIR). For example, the HRTF 124 (or HRIR) can be scaled (e.g., non-dimensionalized), such as by scaling the HRTF 124 by a $d_3$ distance identified from the image data 128.

The HRTFs 124 can be generated or detected in various manners, such as by providing an audio sensor (e.g., microphone) at the location of the ear, outputting sounds from a plurality of audio output devices (e.g., speakers) at various locations around the ear, and using sounds detected by the audio sensor to determine how the HRTF 124 modifies the outputted sounds to be received as the detected sounds. The HRTFs 124 can be specific to a particular ear of the corresponding subject; for example, each subject can have at least one of a left ear HRTF 124 associated with a left ear of the subject and a right ear HRTF 124 associated with a right ear of the subject. The image capture device 104 or other components of the HRTF generation system 100 can delete the at least one image (or the image data thereof) subsequent to generation of the HRTF 124 for the user.

The image data 128 can include images of at least one of the left ear or the right ear of the subject. For example, the image data 128 can be detected by an image capture device incorporating features of the image capture device 104. The image data 128 can include two-dimensional or three-dimensional images of the ears of subjects. The image data 128 can include (or the HRTF generation system 100 can generate from three-dimensional images) three-dimensional meshes of the ears, such as meshes having vertices corresponding to three-dimensional locations of features of the ears.

The image data 128 can include a plurality of markers of the corresponding ear. The markers can be associated with landmarks of the ears, such as particular anatomical features. The markers can be locations (e.g., pixel coordinates) of the landmarks. For example, the markers can include locations associated with or assigned to anatomical features including the helix, ascending helix, foseta, inferior crus of antihelix, crus of helix, tragus, incisura, lobe, antitragus, concha, antihelix, and superior crus of antihelix. In examples in which the image data 128 includes three-dimensional meshes representative of the ears, the markers can be selected from vertices of the meshes corresponding to the landmarks.

An orientation of the image data 128 (e.g., left ear, right ear) can be assigned to the image data 128. This can enable the effective size of the HRTF database 116 to be increased for matching or model training, as all ears can be candidate matches (or used for training) independent of the orientation. For example, the HRTF generation system 100 can be configured to use ears of a predetermined orientation (e.g., all left ears, all right ears), determine whether the image data 128 of a particular subject is in the predetermined orientation, and flip the image data 128 responsive to the image data 128 not being in the predetermined orientation so that the image data 128 has the particular orientation.

Figure 2:
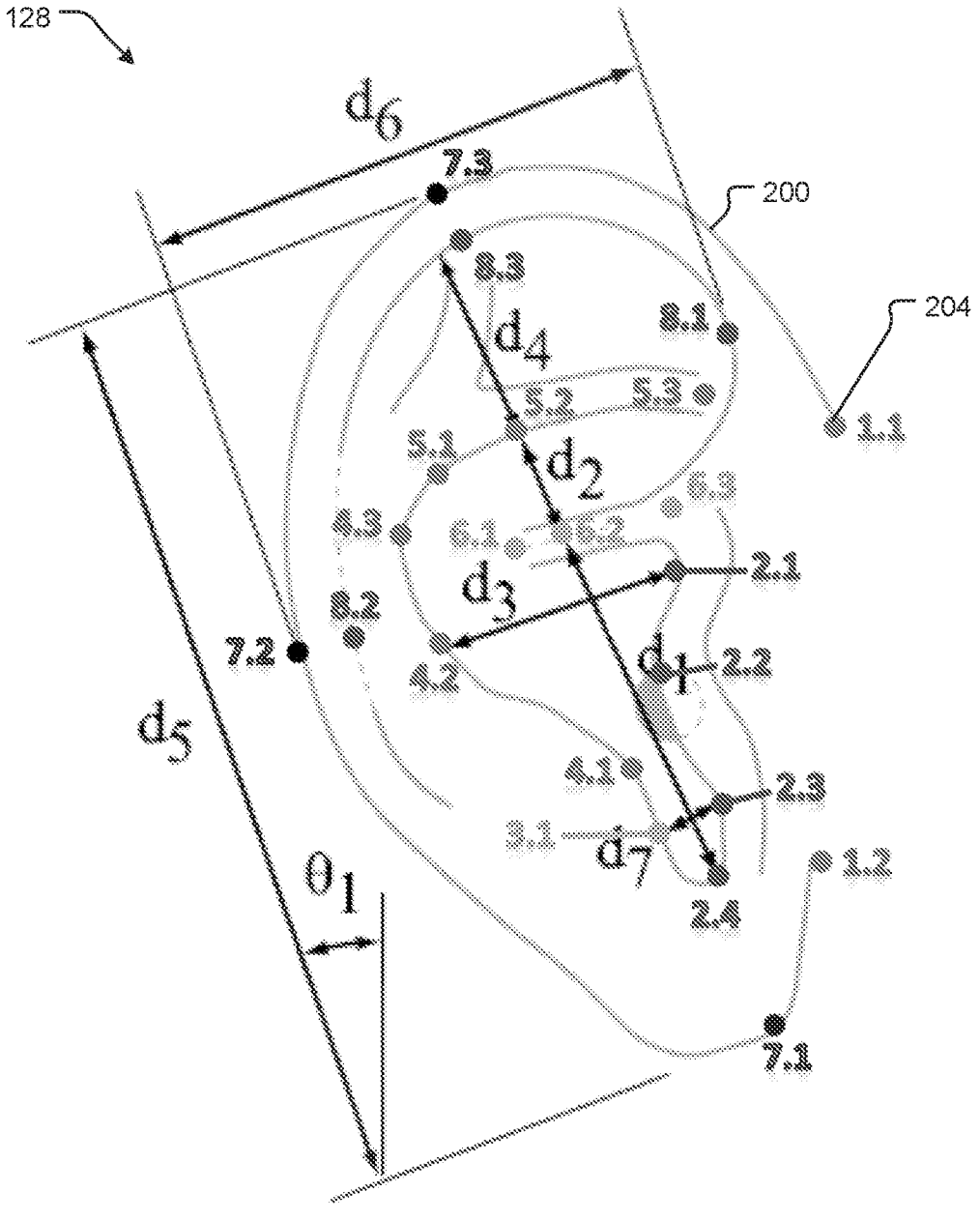
FIG. 2 is a schematic diagram of an example of an ear labeled with landmarks.

FIG. 2 depicts an example of image data 128 of an ear 200. The ear 200 has markers 204 assigned to the ear 200. The markers 204 can have assigned characteristics, such as distances and angles. For example, as depicted in FIG. 2, distances $d_1$, $d_2$, $d_3$, $d_4$, $d_5$, $d_6$, and $d_7$ can be assigned to the image data 128, as well as angle $\theta_1$. The markers 204 or characteristics thereof can be assigned to the images of the image data 128 (e.g., based on hand-labelling or use of the feature detector 132 described below).

Referring further to FIGS. 1 and 2, the markers 204 (and characteristics thereof) can be determined by a feature detector 132. The feature detector 132 can include any function, operation, routine, logic, model, or instructions executed by one or more processors to generate features from the image data 128 and assign the features to the image data 128. The feature detector 132 can extract features from the image data 128, such as edges, shapes, curves, landmarks associated with markers 204, or other features, in order to assign the markers 204 to the image data 128. The feature detector 132 can perform operations on the image data received from the image capture device 104 in a similar manner as described herein for the image data 128.

The feature detector 132 can perform a scaling operation on the image data 128 (or the image data received from the image capture device 104 for the ears of the user) based on the distances determined for the markers 204. This can enable the HRTF generation system 100 to focus on the shapes of the ears used for matching (or training), which can be a more significant factor for HRTF generation than relative size while still enabling accurate generation of the HRTFs. For example, the feature detector 132 can multiply (or divide) one or more of the distances based on a predetermined scaling factor, such as one or more of the distances, such as to non-dimensionalize the locations of the markers 204 or distances between markers 204. For example, the feature detector 132 can divide the distances by the distance $d_3$ to non-dimensionalize the distances, such that the image data 128 for each ear in the HRTF database 116 can represent the shape of the corresponding ear independent of a size of the ear (and, when performed together with flipping image data 128 as appropriate to make all image data 128 have a same orientation, such as left ear or right ear orientation, allowing the image data 128 to be independent of both orientation and scale).

The feature detector 132 can include a machine learning model trained to detect features such as landmarks. The machine learning model can be trained using training data such as image data 128 in which image data of ears is labeled with markers of landmarks (e.g., markers of anatomical features), such as by performing supervised learning using the training data to compare candidate output of the machine learning model with the labeled locations of the landmarks and modifying the machine learning model to reduce differences between the candidate output and the labeled locations. The machine learning model can be trained to generate heatmaps corresponding to candidate locations of landmarks, such that the feature detector 132 can select the marker 204 for a particular landmark to be a peak of a corresponding heatmap.

The machine learning model of the feature detector 132 can include one or more neural networks. For example, the machine learning model can be a generative adversarial network (GAN). The GAN can be trained so that the detected locations of landmarks for the marker 204 correspond to feasible ear shapes (e.g., to enforce implicit logical consistency in the detected landmark locations). For example, the GAN can include or be coupled with a discriminator to apply an additional loss in training the ear landmark detector model. The training data for the GAN can be generated by labelling vertices corresponding to the landmarks of three-dimensional ear meshes (e.g., 3D ear meshes of image data 128). The feature detector 132 can determine feasible two-dimensional landmark configurations by computing perspective camera projections of each labelled ear from various camera locations, angles, and magnifications. The feature detector can generate, from the landmark locations, heatmaps of a Gaussian centered at the landmark location, one heatmap per landmark. The GAN can be multi-channel image GAN trained using this data, such that the generator can be incentivized to produce feasible heatmap sets (e.g., similar to those in the data). The GAN can include or be coupled with a discriminator trained to differentiate between heatmap sets from the original dataset (positive examples to accept) and those created by the generator (negative examples to reject). To prevent the discriminator from overfitting to an evolving generator, the feature detector 132 can sample (e.g., periodically sample) from previous generator checkpoints for negative examples to train the discriminator. The GAN can be trained until a convergence condition is satisfied (e.g., until the generator produces visually feasible landmark configurations). The trained discriminator can be used as a loss function (e.g., additional loss function) in training the ear landmark detector of the GAN, such as by providing the output heatmaps of the detector as input to the discriminator, with the detector penalized if its output is rejected as unfeasible.

Referring further to FIG. 1, the feature detector 132 can determine (e.g., as the output of the machine learning model), for one or more expected landmarks of the ear, a landmark score. The landmark score can represent whether the landmark has been detected with sufficient accuracy in terms of corresponding to a real-world anatomical feature of an ear (e.g., the landmark has sufficient ear-ness). Responsive to the landmark score of a particular landmark not satisfying a landmark score threshold, the feature detector 132 can discard the particular landmark, such as by outputting a data structure that identifies a plurality of markers for the ear, the plurality of markers not including a marker for the particular landmark. This can enable more accurate matching of images of the ears of the subject with images of the ears in the HRTF database 116.

The HRTF generation system 100 can include an ear matcher 136. The ear matcher 136 can match the image data of the at least one image received from the image capture device 104 with image data 128 of the HRTF database 116, in order to identify matching ears and thus point to HRTFs to use for the user. The ear matcher 136 can use the scaled and flipped (e.g., non-dimensionalized and set to either a left ear orientation or right ear orientation) image data to allow for comparisons to be made between the image data of the at least one image and any of the image data 128 of the HRTF database 116 (e.g., independent of the size of the ears and the left or right orientation of the ears).

For example, the ear matcher 136 can compare the image data of the at least one image with image data 128 of a plurality of subject data structures 120 of the HRTF database 116, and select at least one particular subject data structure 120 (e.g., for each of the left and right ear) by evaluating a matching condition based on the comparison. The matching condition can be, for example, a condition to minimize differences between the image data of the at least one image and the image data 128, or reduce the differences to be less than a threshold difference. The ear matcher 136 can output the particular subject data structure 120 responsive to the comparison satisfying the matching condition, or output an error or other indication of no match responsive to the comparison not satisfying the matching condition.

The matching condition can be determined by evaluating a function to identify a closest match between image data of the at least one image and image data 128 of the HRTF database 116. For example, the function can receive, as input, one or more of the (non-dimensionalized) distances between markers of the respective image data, determine differences between corresponding distances (e.g., corresponding distances between the same landmarks of the respective ears), and output a value based on the differences. The ear matcher 136 can select the particular subject data structure 120 that has a lowest outputted value of the function. For example, the function can be evaluated as:

$$\underset{(d'_1,d'_2,d'_3,d'_4)\in D_{i\in(1,2,4)}}{\mathrm{argmin}} \sum w_i \left( \frac{d_i - d'_i(d_3/d'_3)}{d_i + d'_i(d_3/d'_3)} \right)^2 \qquad \text{Equation 1}$$

$$w_1 = 0.5, w_2 = 0.2, w_4 = 0.3$$

where the weights $w_1$, $w_2$, $w_4$ can be values representative of expected or approximate ratios of distances (e.g., based on ratios typical for ear shapes). By implementing various such matching of features of the ears representative of the shapes of the ears (e.g., scaled distances between markers of landmarks), the ear matcher 136 can use relative anthropometric distances, focusing on shape over scale, to perform the matching. The ear matcher 136 can perform the matching for each ear of the user (e.g., using image data of the left ear of the user to identify a first matching image data 128 of the HRTF database 116 and image data of the right ear of the user to identify a second matching image data 128 of the HRTF database 116, which may correspond to ears of different subjects).

The HRTF generation system 100 can include an HRTF generator 140. The HRTF generator 140 can be any function, operation, routine, logic, model, or instructions executed by one or more processors of the HRTF generation system 100 to generate an output HRTF (e.g., individualized HRTF) to provide for use by various applications or devices, such as an audio output device 144 (which can be associated with the image capture device 104) based on the particular subject data structure 120 selected for the user.

The HRTF generator 140 can retrieve, from the particular subject data structure 120, a particular HRTF 124 (e.g., template HRTF) of the particular subject data structure 120. The HRTF generator 140 can modify the particular HRTF 124 to generate the output HRTF for the user (including perform various operations described herein, such as scaling, flipping, or interaural time difference modification, in various orders). Responsive to the particular HRTF 124 not having the same orientation as the ear of the user for which the particular HRTF 124 is to be used (which the HRTF generator 140 can determine by identifying an orientation of the image data of the at least one image of the ear of the subject and determining that the orientation is not the orientation of the image data 128), the HRTF generator 140 can apply a flip operation to the particular HRTF 124. The HRTF generator 140 can scale the particular HRTF 124 by identifying the size scale of the image data of the at least one image (e.g., the $d_3$ distance) used to scale the image data, and applying an inverse of the size scale to the particular HRTF 124. Flipping the particular HRTF 124 (or the HRIR associated with the HRTF 124) can include flipping the particular HRTF 124 from left to right by performing a mirroring operation, and performing a corresponding operation to the directions associated with the HRTFs in the database. Scaling the particular HRTF 124 can include scaling the particular HRTF 124 by a scaling factor proportional to a ratio of the size scales. For example, if the $d_3$ distance of the image data of the user is 10 millimeters (mm), and the $d_3$ distance of the image data 128 of the matching ear in the HRTF database 116 is 12 mm, a scaling factor of 12/10 can be applied to the HRIR of the particular HRTF 124 to generate the output HRIR (e.g., because the ear of the user is smaller than the ear of the HRTF database 116 and thus should have higher frequencies). Scaling the particular HRTF 124 (as well as various other HRTFs) can include performing the scaling in the time domain by scaling the HRIR of the particular HRTF 124; for the example above, the HRIR of the particular 124 would be scaled (e.g., compressed) in time by a factor of 10/12.

The HRTF generator 140 can rotate the particular HRTF 124 to account for rotation of the ears (e.g., relative to a baseline, such as a baseline in which a distance such as the $d_3$ distance is aligned with a horizontal axis of a frame of reference from which the rotation is determined). For example, the HRTF generator 140 can identify an angle of the image data associated with the user (e.g., angles such as an angle defined relative to the distances used for determining the scaling factor; the angle $\theta_1$ depicted in FIG. 2), compare the angle with a corresponding angle (e.g., an angle determined based on the same landmarks as the angle of the image data associated with the user), and rotate the particular HRTF 124 so that the corresponding angle of the image data 128 of the particular HRTF 124 is aligned with the angle of the image data associated with the user.

The HRTF generator 140 can apply a head and torso (HAT) model to the particular HRTFs 124 for the left ear and right ear to account for interaural time differences. The HAT model can be a model that adjusts how sound is outputted based on anatomical features of the user. For example, the HRTF generator 140 can use the size scale or other size characteristic of the user determined from the image data of the at least one image detected by the image capture device 104 as input to provide to the HAT model together with the HRTFs 124 to generate the output HRTF.

As such, the HRTF generation system 100 can generate the output HRTF (e.g., individualized HRTF) to accurately represent how the user's anatomy affects sound before perception by the ears of the user in a manner independent of the size or orientation of each ear of the user, and accounting for interaural time differences. The output HRTF can be generated in a lightweight manner using image data detected by a cell phone or other portable electronic image capture device, circumventing the need for complex computations or audio sensor hardware to map the user's ear.

Referring further to FIG. 1, the HRTF generation system 100 and components or devices thereof can include one or more processors 160 and memory 164. The processor 160 can be implemented as a specific purpose processor, an application specific integrated circuit (ASIC), one or more field programmable gate arrays (FPGAs), a group of processing components, or other suitable electronic processing components. The processors 160 and memory 164 can be implemented using one or more devices, such as devices in a client-server implementation. The memory 164 can include one or more devices (e.g., RAM, ROM, flash memory, hard disk storage) for storing data and computer code for completing and facilitating the various user or client processes, layers, and modules. The memory 164 can be or include volatile memory or non-volatile memory and may include database components, object code components, script components, or any other type of information structure for supporting the various activities and information structures of the inventive concepts disclosed herein. The memory 164 can be communicably connected to the processor 160 and include computer code or instruction modules for executing one or more processes described herein. The memory 164 can include various circuits, software engines, and/or modules that cause the processor 160 to execute the systems and methods described herein, such as the image detector 112, HRTF database 116, feature detector 132, ear matcher 136, and HRTF generator 140.

The HRTF generation system 100 can include communications electronics 168 to facilitate electronic communications of data (e.g., image data, HRTFs) amongst various devices and components. The communications electronics 168 can conduct wired and/or wireless communications. For example, the communications electronics 220 can include one or more wired (e.g., Ethernet) or wireless transceivers (e.g., a Wi-Fi transceiver, a Bluetooth transceiver, a NFC transceiver, a cellular transceiver).

Various components of the HRTF generation system 100 (including processors 160 and memory 164) can be distributed across various devices. For example, the image capture device 104 can include an application that detects the images of the ears of the user and transmits the images or image data extracted from the images (e.g., by image detector 112) to a server device (e.g., cloud server) that maintains the HRTF database 116 and executes components including the HRTF generator 140 to generate the output HRTF. The output HRTF can be transmitted to the image capture device 104 (e.g., for further use by the audio output device 144, which may be implemented as part of the image capture device 104 or communicatively coupled with the image capture device 104). The server device can operate the ear matcher 136 to select the particular subject data structures 120 matching the ears of the user, and provide the particular HRTFs (e.g., in a non-dimensionalized format) to the image capture device 104, which can operate the HRTF generator 140 to generate the output HRTF.

The audio output device 144 can apply, as input to the output HRTF, various audio data (which can include source locations of the sound represented by the audio data) to generate and output spatially localized audio. For example, the audio output device 144 can be a local device (e.g., client device) that receives the audio data and output HRTF to generate the spatially localized audio, or can be a server device that transmits the spatially localized audio (e.g., streams data representing the spatially localized audio) to a client device. This can enable the HRTF generation system 100 to generate audio for various uses and devices, including but not limited to simulation, gaming, media streaming, events, headphones, surround sound speakers, and various combinations thereof.

Figure 3:
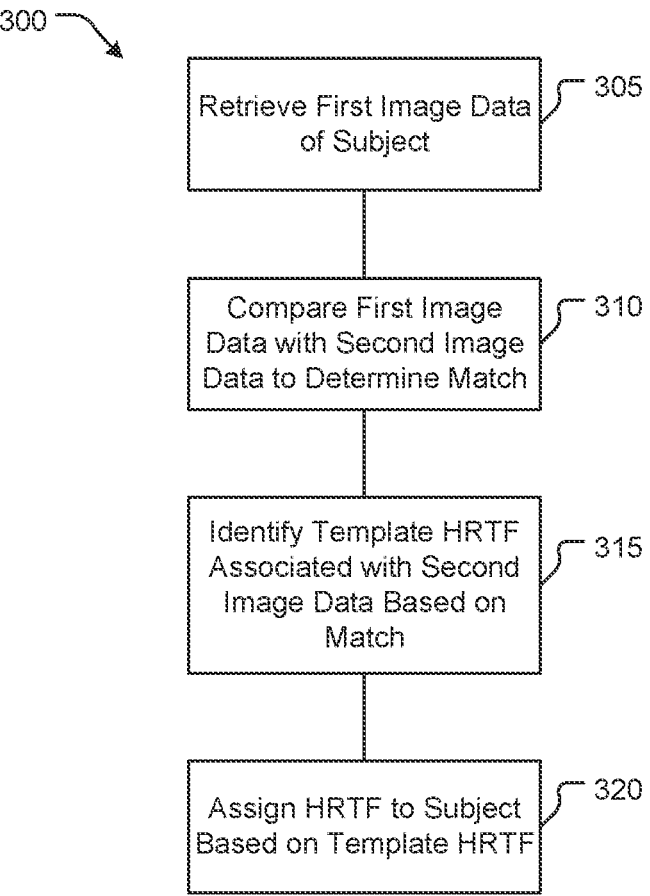
FIG. 3 is a flow diagram of an example of a method for generating HRTFs for users.

FIG. 3 depicts an example of a method 300 for generating HRTFs for a user. The method 300 can be performed using various systems and devices described herein, including but not limited to the HRTF generation system 100 or components thereof. Various features of the method 300 can be performed in sequence or in parallel, including in batches. For example, HRTF matching or generation operations for a particular user can be performed in sequence or in parallel for image data of each ear of the particular user; HRTF matching or generation operations can be performed in batches for image data received from multiple users.

At 305, first image data of a first ear of a subject is retrieved. The first image data can include an image of the first ear, such as an image detected by a cell phone or other portable electronic device or camera. The first image data can include features extracted from the image of the ear, such as size scales, markers of landmarks (e.g., predetermined anatomical landmarks of the ear), distances between markers, or various combinations thereof. First image data of both ears of the subject can be retrieved. Pre-processing operations such as scaling (e.g., non-dimensionalizing), flipping, lighting modifications, pose modifications, can be performed on the first image data.

At 310, the first image data is compared with second image data of a plurality of second ears of other subjects. The comparison can be performed to determine a match between the first ear of the subject and at least one second ear. The second image data can include distances between markers of landmarks of the second ears (which can be identified by applying the second image data as input to a machine learning model, such as a GAN, trained to detect the landmarks). For example, performing the comparison can include determining differences between one or more first distances of the first image data and one or more second distances of the second image data. The first distances and second distances can be scaled (e.g., non-dimensionalized) such as by dividing each of the first distances by a particular distance of the first image data (e.g., a $d_3$ distance) and each of the second distances by a particular distance of the second image data to facilitate performing the comparison in a manner independent of the scales of the first image data and second image data. For example, performing the comparison can include determining differences between corresponding distances of the first and second image data (e.g., differences between distances determined between the same landmarks of each ear). The comparisons can be performed to identify a particular second ear (or the image data of the second ear) for which the differences (e.g., a function evaluated based on the differences) satisfy a matching condition, such as a requirement that the differences be below a threshold or be minimized.

At 315, responsive to performing the comparison to identify the particular second ear, a template HRTF associated with the particular second ear can be identified. For example, the second image data can be maintained in a database that includes data structures that associate image data of ears with HRTFs generated for the ears. The template HRTF can be retrieved from the data structure for the particular second ear.

At 320, an individualized HRTF can be assigned to the subject based on the template HRTF. For example, the template HRTF can be modified to be used for the subject by applying operations such as flipping (e.g., if the template HRTF is for an opposite ear as the first ear of the subject, flipping the template HRTF with respect to azimuth), scaling (e.g., multiplying the template HRTF (or an HRIR of the HRTF) by the particular distance of the first image data or a ratio of the particular distance of the first image data to the corresponding distance of the second image data associated with the template HRTF), rotating (e.g., rotating the template HRTF to align with a rotation of the first image data) and correcting for interaural time differences using an HAT model. Assigning the individualized HRTF to the subject can include storing an association between the individualized HRTF and the subject in a database. Assigning the individualized HRTF to the subject can include providing the modified template HRTF to a device, such as a device from which the first image data was received, an audio output device (e.g., headphones) for outputting audio using the individualized HRTF to enable the device to generate accurate three-dimensional audio for the subject, or a memory device that is capable of interfacing with such an audio output device to allow a user to transfer the individualized HRTF to the audio output device.

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Computer program products are stored in a tangible form on non-transitory computer readable media and non-transitory physical hardware storage devices that are suitable for embodying computer program instructions and data. These include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory and other non-transitory devices.

The construction and arrangement of the systems and methods as shown in the various embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced. Other substitutions, modifications, changes, and omissions may be made in the design, operating conditions and arrangement of embodiments without departing from the scope of the present disclosure.

As utilized herein, the terms "approximately," "about," "substantially", and similar terms are intended to include any given ranges or numbers +/−10%. These terms include insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products including machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for generating an individualized head related transfer function (HRTF), comprising:
retrieving, by one or more processors, first image data of a first ear of a subject;
rotating, by the one or more processors, the first image data so that an orientation of the first image data matches an orientation of second image data of a plurality of second ears;
comparing, by the one or more processors, the first image data with the second image data of the plurality of second ears to identify a particular second ear of the plurality of second ears matching the first ear;
identifying, by the one or more processors, a template HRTF associated with the particular second ear; and
outputting, by the one or more processors, the individualized HRTF for the subject based on the template HRTF.

2. The method of claim 1, further comprising:
identifying, by the one or more processors, whether the first ear is a left ear or a right ear;
if the plurality of second ears are left ears, upon identifying that the first ear is a right ear, flipping, by the one or more processors, the first image data; and
if the plurality of second ears are right ears, upon identifying that the first ear is a left ear, flipping, by the one or more processors, the first image data.

3. The method of claim 1, wherein the first image data comprises a plurality of markers of the first ear, each marker of the plurality of markers representing a location of an anatomical landmark of the first ear.

4. The method of claim 3, wherein the first image data is an image of the first ear, the method further comprising generating, by the one or more processors, the plurality of markers from the first image.

5. The method of claim 1, comprising:
maintaining the second image data to have a non-dimensional scale based on a particular distance of the second image data; and
modifying the first image data to have the non-dimensional scale.

6. The method of claim 1, wherein comparing the first image data with the second image data comprises:
modifying, by the one or more processors, the first image data to have at least one of a non-dimensional scale or a scale of the second image data; and
comparing, by the one or more processors, the modified first image data with the second image data.

7. The method of claim 1, wherein determining the particular at least one second ear matching the first ear comprises:
determining, by the one or more processors, a plurality of first distances between a plurality of first markers of the first ear; and
selecting, by the one or more processors, the particular second ear responsive to comparing the plurality of first distances with a plurality of second distances between a plurality of second markers of each second ear of the plurality of second ears.

8. The method of claim 7, wherein selecting the particular second ear comprises determining, using the plurality of first distances and the plurality of second distances, a weighted minimization of differences between the plurality of first distances and the plurality of second distances.

9. The method of claim 1, further comprising:
training, by the one or more processors, a machine learning model to generate markers of ears using training data comprising second markers assigned to each ear of the plurality of second ears; and
generating, by the one or more processors, a plurality of first markers of the first ear by applying the first image data as input to the machine learning model.

10. The method of claim 1, further comprising applying a head and torso (HAT) model to the template HRTF to generate the individualized HRTF.

11. The method of claim 1, further comprising:
identifying a first rotational orientation of the first image data and a second rotational orientation of the second image data associated with the particular second ear; and
applying a rotation to the template HRTF based on the first rotational orientation and the second rotational orientation.

12. The method of claim 1, further comprising generating, by an audio output device, audio output data by applying audio data and a source location of the audio data as input to the individualized HRTF.

13. A system, comprising:
one or more processors configured to:
retrieve first image data of a first ear of a subject;
rotate the first image data so that an orientation of the first image data matches an orientation of second image data of a plurality of second ears;
compare the first image data with the second image data of the plurality of second ears to identify a particular second ear of the plurality of second ears matching the first ear;

identify a template HRTF associated with the particular second ear; and output an individualized HRTF for the subject based on the template HRTF.

14. The system of claim 13, wherein the one or more processors are further configured to:

identify whether the first ear is a left ear or a right ear if the plurality of second ears are left ears, upon identifying that the first ear is a right ear, flipping the first image data; and if the plurality of second ears are right ears, upon identifying that the first ear is a left ear, flipping the first image data.

15. The system of claim 13, wherein the one or more processors are configured to compare the first image data with the second image data by:

modifying the first image data to have at least one of a non-dimensional scale or a scale of the second image data; and comparing the modified first image data with the second image data.

16. The system of claim 13, wherein the one or more processors are configured to:

train a machine learning model to generate markers of ears using training data comprising second markers assigned to each ear of the plurality of second ears; and generate a plurality of first markers of the first ear by applying the first image data as input to the machine learning model.

17. A method for generating an individualized head related transfer function HRTF), comprising:

retrieving, by one or more processors, first image data of a first ear of a subject;

comparing, by the one or more processors, the first image data with second image data of a plurality of second ears to identify a particular second ear of the plurality of second ears matching the first ear;

identifying, by the one or more processors, a template HRTF associated with the particular second ear;

identifying a first rotational orientation of the first image data and a second rotational orientation of the second image data associated with the particular second ear; and applying a rotation operation to the template HRTF based on the first rotational orientation and the second rotational orientation; and outputting, by the one or more processors, the individualized HRTF for the subject based on the template HRTF.

* * * * *